US012120515B2

(12) United States Patent
Trainin et al.

(10) Patent No.: US 12,120,515 B2
(45) Date of Patent: Oct. 15, 2024

(54) PROTECTED SESSIONLESS WIFI SENSING

(71) Applicant: QUALCOMM Incorporated, San Diego, CA (US)

(72) Inventors: Solomon Trainin, Haifa (IL); Alecsander Eitan, Haifa (IL); Assaf Kasher, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 593 days.

(21) Appl. No.: 17/211,444

(22) Filed: Mar. 24, 2021

(65) Prior Publication Data

US 2022/0312213 A1   Sep. 29, 2022

(51) Int. Cl.
*H04L 29/06* (2006.01)
*H04B 7/0456* (2017.01)
(Continued)

(52) U.S. Cl.
CPC ........ *H04W 12/106* (2021.01); *H04B 7/0456* (2013.01); *H04B 7/0617* (2013.01); *H04W 12/08* (2013.01); *H04W 84/12* (2013.01)

(58) Field of Classification Search
CPC ... H04W 12/106; H04W 12/08; H04W 84/12; H04W 28/18; H04W 12/108; H04B 7/0456; H04B 7/0617
See application file for complete search history.

(56) References Cited

U.S. PATENT DOCUMENTS

2009/0307766 A1* 12/2009 Rose ..................... H04L 63/123
726/13

2010/0329225 A1* 12/2010 Balasubramanian ... H04L 43/16
455/404.1
(Continued)

FOREIGN PATENT DOCUMENTS

WO    WO-2022101087 A1 *  5/2022  ......... H04L 61/5038

OTHER PUBLICATIONS

Jonathan W. Hui, David E. Culler, "IP is Dead, Long Live IP for Wireless Sensor Networks"; SenSys '08: Proceedings of the 6th ACM Conference on Embedded Network Sensor Systems; Nov. 2008; pp. 15-28 (Year: 2008).*

(Continued)

*Primary Examiner* — Fatoumata Traore
*Assistant Examiner* — Courtney D Fields
(74) *Attorney, Agent, or Firm* — Holland & Hart / Qualcomm

(57) ABSTRACT

This disclosure provides systems, methods, and apparatuses for wireless sensing. In some aspects, a first wireless communication device may receive a first wireless transmission including a transmit (TX) parameter information element (IE). The first wireless communication device may verify the integrity of the TX parameter IE using a message integrity code (MIC) in the first wireless transmission, discarding the first wireless transmission when the MIC does not verify the integrity of the TX parameter IE. The first wireless device may obtain one or more transmission parameters for one or more second wireless communication devices associated with the TX parameter IE. The first wireless communication device may receive a second wireless transmission from one of the second wireless communication devices and obtain one or more wireless sensing measurements associated with the second wireless transmission and the one or more transmission parameters.

27 Claims, 10 Drawing Sheets

(51) Int. Cl.
    *H04B 7/06*     (2006.01)
    *H04W 12/08*     (2021.01)
    *H04W 12/106*     (2021.01)
    *H04L 61/5038*     (2022.01)
    *H04W 12/02*     (2009.01)
    *H04W 12/122*     (2021.01)
    *H04W 84/12*     (2009.01)

(56) References Cited

U.S. PATENT DOCUMENTS

2020/0305231 A1    9/2020    Sadeghi et al.
2020/0371220 A1*  11/2020  Eitan ........................ G01S 13/46
2021/0211973 A1*  7/2021    Chen ....................... H04W 48/16

OTHER PUBLICATIONS

Chen C (Intel)., "WLAN Sensing Definitions", IEEE Draft, 11-20-0807-00-SENS-WLAN-Sensing-Definitions, IEEE-SA Mentor, Piscataway, NJ USA, vol. 802.11 SENS, May 25, 2020 (May 25, 2020), pp. 1-12, XP068168048, Retrieved from the Internet: URL: https://mentor.ieee.org/802.11/dcn/20/11-20-0807-00-SENS-wlan-sensing-definitions.pptx [retrieved on May 25, 2020] the whole document.

International Search Report and Written Opinion—PCT/US2022/017030—ISA/EPO—May 17, 2022.

Kim S (LGE)., et al., "Collaborative WLAN Sensing-Follow Ups", IEEE Draft, 11-21-0145-05-00BF-Collaborative-WLAN-Sensing-Follow-Ups, IEEE-SA Mentor, Piscataway, NJ USA, vol. 802.11bf, No. 5, Mar. 9, 2021 (Mar. 9, 2021), pp. 1-19, XP068179067, Retrieved from the Internet: URL: https://mentor.ieee.org/802.11/dcn/21/11-21-0145-05-00bf-collaborative-wlan-sensing-follow-ups.pptx [retrieved on Mar. 9, 2021] the whole document.

Silva C.D (Intel)., et al., "A Channel Measurement Procedure for WLAN Sensing", IEEE Draft, 11-20-0842-00-SENS-A-Channel-Measurement-Procedure-for-WLAN-Sensing, IEEE-SA Mentor, Piscataway, NJ USA, vol. 802.11 SENS, Jun. 5, 2020 (Jun. 5, 2020), pp. 1-14, XP068169423, Retrieved from the Internet: URL: https://mentor.ieee.org/802.11/dcn/20/11-20-0842-00-SENS-a-channel-measurement-procedure-for-wlan-sensing.pptx [retrieved on Jun. 5, 2020] the whole document.

* cited by examiner

PROTECTED SESSIONLESS WIFI SENSING

TECHNICAL FIELD

This disclosure relates generally to wireless sensing, and to using wireless signals and their reflections to sense objects in an environment.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

WLAN sensing or WiFi sensing generally refers to a WLAN in which one or more WLAN devices monitor or map the environment using standard WLAN signals. For example, a WiFi sensing system may use the signal reflections off of walls or other objects, including people, to map and measure the environment, and to identify and track objects within that environment.

SUMMARY

The systems, methods, and devices of this disclosure each have several innovative aspects, no single one of which is solely responsible for the desirable attributes disclosed herein.

One innovative aspect of the subject matter described in this disclosure can be implemented in a first wireless communication device. An example first wireless communication device includes an interface configured to obtain a first wireless transmission, the first wireless transmission including a transmit (TX) parameter information element (IE). The interface is also configured to obtain a second wireless transmission. The first wireless communication device also includes a processing system configured to obtain one or more transmission parameters for one or more second wireless communication devices associated with the TX parameter IE. The processing system is also configured to obtain one or more wireless sensing measurements associated with the second wireless transmission and the one or more transmission parameters.

In some aspects, the processing system is further configured to verify an integrity of the TX parameter IE associated with a message integrity code (MIC) in the first wireless transmission. In some aspects, the MIC is configured to verify an integrity of at least an access category (AC) or traffic stream (TS) associated with the first wireless transmission.

In some aspects, the first wireless transmission is obtained from an access point (AP), and the TX parameter IE indicates that each of the one or more second wireless communication devices have static transmission parameters, and the second wireless transmission is obtained from one of the one or more second wireless communication devices.

In some aspects, the first wireless transmission includes a frame obtained from a non-AP station (STA) and the second wireless transmission is obtained from the non-AP STA. In some aspects, the frame is included in an aggregated media access control (MAC) protocol data unit (A-MPDU). In some aspects, the frame includes an initial physical layer (PHY) protocol data unit (PPDU) of an aggregated PPDU (A-PPDU). In some aspects, the frame includes a public frame transmitted at a basic modulation and coding scheme (MCS). In some aspects, the TX parameter IE is obtained with each transmission received from the non-AP STA. In some aspects, the TX parameter IE is obtained periodically from the non-AP STA. In some aspects, the TX parameter IE indicates a transmit power of the non-AP STA. In some aspects, the TX parameter IE indicates one or more of changes in multiple-input multiple-output (MIMO) precoding used by the non-AP STA and changes in beamforming and antenna selection settings used by the non-AP STA. In some aspects an index in the TX parameter IE indicates a change in the MIMO precoding or beamforming and antenna selection settings used by the non-AP STA. In some aspects, the TX parameter IE indicates whether or not the non-AP STA has moved since the non-AP STA transmitted a previous frame including a TX parameter IE.

Another innovative aspect of the subject matter described in this disclosure can be implemented as a method for wireless communication. In some implementations, the method may be performed by a first wireless communication device. The method may include receiving a first wireless transmission, the first wireless transmission including a transmit (TX) parameter information element (IE). The method includes receiving one or more transmission parameters for one or more second wireless communication devices associated with the TX parameter IE. The method includes receiving a second wireless transmission from one of the one or more second wireless communication devices. The method includes receiving one or more wireless sensing measurements associated with the second wireless transmission and the one or more transmission parameters.

In some aspects, the method includes verifying an integrity of the TX parameter IE associated with a message integrity code (MIC) in the first wireless transmission. In some aspects, the MIC is configured to verify an integrity of at least an access category (AC) or traffic stream (TS) associated with the first wireless transmission.

In some aspects, the first wireless transmission is received from an access point (AP), and the TX parameter IE indicates that each of the one or more second wireless communication devices have static transmission parameters.

In some aspects, the first wireless transmission includes a frame received from a non-AP station (STA) and the second wireless transmission is received from the non-AP STA. In some aspects, the frame is included in an aggregated media access control (MAC) protocol data unit (A-MPDU). In some aspects, the frame includes an initial physical layer (PHY) protocol data unit (PPDU) of an aggregated PPDU (A-PPDU). In some aspects, the frame includes a public frame transmitted at a basic modulation and coding scheme (MCS). In some aspects, the TX parameter IE is received with each transmission received from the non-AP STA. In some aspects, the TX parameter IE is received periodically from the non-AP STA. In some aspects, the TX parameter IE indicates a transmit power of the non-AP STA. In some aspects, the TX parameter IE indicates one or more of changes in multiple-input multiple-output (MIMO) precoding used by the non-AP STA and changes in beamforming and antenna selection settings used by the non-AP STA. In some aspects an index in the TX parameter IE indicates a change in the MIMO precoding or beamforming and antenna selection settings used by the non-AP STA. In some aspects, the TX parameter IE indicates whether or not the non-AP STA has moved since the non-AP STA transmitted a previous frame including a TX parameter IE.

Another innovative aspect of the subject matter described in this disclosure can be implemented as a non-transitory computer-readable storage medium. The non-transitory computer-readable storage medium stores instructions for execution by one or more processors of a first wireless communication device. Execution of the instructions causes the first wireless communication device to perform operations including receiving a first wireless transmission, the first wireless transmission including a transmit (TX) parameter information element (IE). The operations include receiving one or more transmission parameters for one or more second wireless communication devices associated with the TX parameter IE. The operations include receiving a second wireless transmission from one of the one or more second wireless communication devices. The operations include receiving one or more wireless sensing measurements associated with the second wireless transmission and the one or more transmission parameters.

In some aspects, the operations include verifying an integrity of the TX parameter IE associated with a message integrity code (MIC) in the first wireless transmission. In some aspects, the MIC is configured to verify an integrity of at least an access category (AC) or traffic stream (TS) associated with the first wireless transmission.

In some aspects, the first wireless transmission is received from an access point (AP), and the TX parameter IE indicates that each of the one or more second wireless communication devices have static transmission parameters.

In some aspects, the first wireless transmission includes a frame received from a non-AP station (STA) and the second wireless transmission is received from the non-AP STA. In some aspects, the frame is included in an aggregated media access control (MAC) protocol data unit (A-MPDU). In some aspects, the frame includes an initial physical layer (PHY) protocol data unit (PPDU) of an aggregated PPDU (A-PPDU). In some aspects, the frame includes a public frame transmitted at a basic modulation and coding scheme (MCS). In some aspects, the TX parameter IE is received with each transmission received from the non-AP STA. In some aspects, the TX parameter IE is received periodically from the non-AP STA. In some aspects, the TX parameter IE indicates a transmit power of the non-AP STA. In some aspects, the TX parameter IE indicates one or more of changes in multiple-input multiple-output (MIMO) precoding used by the non-AP STA and changes in beamforming and antenna selection settings used by the non-AP STA. In some aspects an index in the TX parameter IE indicates a change in the MIMO precoding or beamforming and antenna selection settings used by the non-AP STA. In some aspects, the TX parameter IE indicates whether or not the non-AP STA has moved since the non-AP STA transmitted a previous frame including a TX parameter IE.

Another innovative aspect of the subject matter described in this disclosure can be implemented as a method for wireless communication. In some implementations, the method may be performed by a first wireless communication device. The method may include receiving a first wireless transmission including a transmit (TX) parameter information element (IE). The method includes, in response to a message integrity code (MIC) in the first wireless transmission not verifying an integrity of the TX parameter IE, discarding the first wireless transmission. The method includes, in response to the MIC verifying the integrity of the TX parameter IE, receiving one or more transmission parameters for one or more second wireless communication devices associated with the TX parameter IE, receiving a second wireless transmission from one of the one or more second wireless communication devices, and receiving one or more wireless sensing measurements associated with the second wireless transmission and the one or more transmission parameters.

In some aspects, the first wireless transmission is received from an access point (AP), and the TX parameter IE indicates that each of the one or more second wireless communication devices have static transmission parameters.

In some aspects, the MIC is configured to verify an integrity of at least an access category (AC) or traffic stream (TS) associated with the first wireless transmission.

In some aspects, the first wireless transmission includes a frame received from a non-AP station (STA) and the second wireless transmission is received from the non-AP STA. In some aspects, the frame is included in an aggregated media access control (MAC) protocol data unit (A-MPDU). In some aspects, the frame includes an initial physical layer (PHY) protocol data unit (PPDU) of an aggregated PPDU (A-PPDU). In some aspects, the frame includes a public frame transmitted at a basic modulation and coding scheme (MCS). In some aspects, the TX parameter IE is received with each transmission received from the non-AP STA. In some aspects, the TX parameter IE is received periodically from the non-AP STA. In some aspects, the TX parameter IE indicates a transmit power of the non-AP STA. In some aspects, the TX parameter IE indicates one or more of changes in multiple-input multiple-output (MIMO) precoding used by the non-AP STA and changes in beamforming and antenna selection settings used by the non-AP STA. In some aspects an index in the TX parameter IE indicates a change in the MIMO precoding or beamforming and antenna selection settings used by the non-AP STA. In some aspects, the TX parameter IE indicates whether or not the non-AP STA has moved since the non-AP STA transmitted a previous frame including a TX parameter IE.

Another innovative aspect of the subject matter described in this disclosure can be implemented in a first wireless communication device. An example first wireless communication device includes an interface configured to obtain a first wireless transmission, the first wireless transmission including a transmit (TX) parameter information element (IE). The interface is also configured to obtain a second wireless transmission. The first wireless communication device also includes a processing system configured to, in response to a message integrity code (MIC) in the first wireless transmission not verifying an integrity of the TX parameter IE, discard the first wireless transmission. The processing system is configured to, in response to the MIC verifying the integrity of the TX parameter IE, obtain one or more transmission parameters for one or more second wireless communication devices associated with the TX parameter IE, and obtain one or more wireless sensing measurements associated with the second wireless transmission and the one or more transmission parameters.

In some aspects, the first wireless transmission is obtained from an access point (AP), and the TX parameter IE indicates that each of the one or more second wireless communication devices have static transmission parameters.

In some aspects, the MIC is configured to verify an integrity of at least an access category (AC) or traffic stream (TS) associated with the first wireless transmission.

In some aspects, the first wireless transmission includes a frame obtained from a non-AP station (STA) and the second wireless transmission is obtained from the non-AP STA. In some aspects, the frame is included in an aggregated media access control (MAC) protocol data unit (A-MPDU). In some aspects, the frame includes an initial physical layer (PHY) protocol data unit (PPDU) of an aggregated PPDU (A-PPDU). In some aspects, the frame includes a public frame transmitted at a basic modulation and coding scheme (MCS). In some aspects, the TX parameter IE is obtained with each transmission received from the non-AP STA. In some aspects, the TX parameter IE is obtained periodically from the non-AP STA. In some aspects, the TX parameter IE indicates a transmit power of the non-AP STA. In some aspects, the TX parameter IE indicates one or more of changes in multiple-input multiple-output (MIMO) precoding used by the non-AP STA and changes in beamforming and antenna selection settings used by the non-AP STA. In some aspects an index in the TX parameter IE indicates a change in the MIMO precoding or beamforming and antenna selection settings used by the non-AP STA. In some aspects, the TX parameter IE indicates whether or not the non-AP STA has moved since the non-AP STA transmitted a previous frame including a TX parameter IE.

Details of one or more implementations of the subject matter described in this disclosure are set forth in the accompanying drawings and the description. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
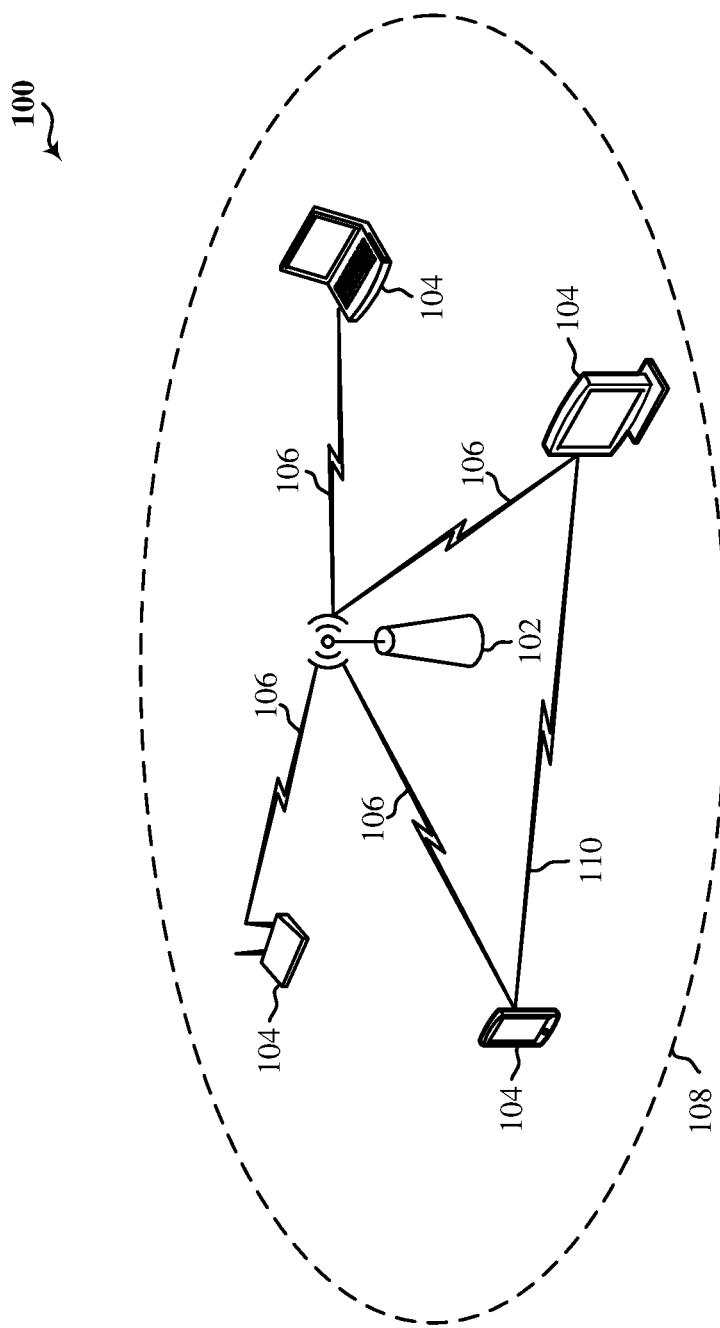
FIG. 1 shows a block diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the 3rd Generation Partnership Project (3GPP), among others. The described implementations can be implemented in any device, system, or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

An AP periodically broadcasts beacon frames to enable any STAs within wireless range of the AP to establish or maintain a communication link with the WLAN. The STAs may wake from sleep states or low power modes at periodic time intervals such as target beacon transmission times (TBTTs) to receive the beacon frames. A beacon frame may include basic network information, discovery information, capabilities, and the like. Some beacon frames include a traffic indication map (TIM) element indicating the presence of queued downlink (DL) data for one or more of the STAs. Other beacon frames may include a delivery traffic indication map (DTIM) indicating whether the AP has queued DL data scheduled for transmission to one or more of the STAs. In some instances, the DTIM also may indicate the group address for a group of STAs.

Various implementations relate generally to wireless sensing using transmissions from wireless communication devices in a wireless network. For example, some implementations implement WiFi sensing using one or more APs and one or more STAs in a WLAN. WiFi sensing may involve the transmission and monitoring changes in channel state information (CSI) of what might be considered standard WiFi PHY signals, such as frames or packets. The reflections and other alterations to the transmitted signals may be used to map and measure the environment around the wireless communication devices, including monitoring the position of objects within the environment. In other words, WiFi sensing effectively allows transmission and reception of WLAN signals to determine and monitor positions, movements, and characteristics of nearby objects. In some cases, a wireless communication device participating in WiFi sensing operations may operate in a full-duplex mode, allowing one antenna(s) to transmit while the other antenna(s) are receiving.

Any suitable techniques may be used to detect and process changes in CSI of received signals. Changes in CSI may be detected, for example, based on a cross-correlation of one or more sequences in transmitted frames (such as in a channel estimation field). The detection may be based on the cross-correlation (CC) results. For example, the CC may be performed to detect reflections and scatters surrounding the wireless node. Changes in CSI due to these reflections may appear as a new tap in the CC output. The wireless node may generate (such as based on the CC results) a table including a distance, angle, material classification, and speed for each target (such as a detected object). Distance may be determined, for example, by measuring a round trip time for a transmitted signal to return to the receiving antenna of the wireless node. In some cases, a sensing device may determine an angle or arrival (AoA) of a received frame, and based on the angle of arrival, the device may generate position information or three dimensional measurement information (such as based on a known location of a transmitting device, the sensing device, or a nearby object). In some cases, a sensing device may determine a direction of motion of an object. In some cases, multiple sensing devices may provide raw measurement data for a central device (such as an AP) to process and determine position sensor data (such as position/location/direction).

One of the challenges in wireless sensing, such as WiFi sensing, is the coordination between different wireless communication devices, for example, to establish which wireless communication devices are transmitting and when, and to establish the expected transmission parameters for each transmitting device. Such transmission parameters may include, for example, transmission power, MIMO precoding, beamforming (BF) and antenna selection, and so on.

Conventional WiFi sensing techniques may establish a session between wireless communication devices to exchange transmission parameters for the frames to be used for sensing. For example, the transmission parameters may be included in one or more frames which are generated in response to a request from one or more of the devices involved in the session. Subsequently, frames to be used for sensing purposes may be transmitted according to the transmission parameters, and subsequently received and measured by one or more receiving devices in the session. However, such session-based WiFi sensing systems may present a number of drawbacks. For example, frames transmitted by devices not included in an established session may not be used for sensing, even when those frames are transmitted within an environment for which WiFi sensing is desirable. Further, frames transmitted by wireless communication devices in an established session, but which are transmitted for other purposes, such as for data transmission, may not be used for sensing. Further, session-based techniques may not support sessions extending across more than one BSS. Additionally, conventional techniques may not support multiple responder sessions initiated by non-AP devices, and thus many frames transmitted are not used for sensing, requiring the transmission of additional frames for sensing purposes, which may lead to congestion in the wireless environment.

Further, it may be desirable to verify the integrity of frames used for exchanging transmission parameters, in order to reduce the risk of man-in-the-middle attacks on WiFi sensing systems. That is, if another wireless communication device transmits one or more frames purporting to advertise transmission parameters for wireless sensing, it may be desirable to verify the integrity of those transmission parameters in order for accurate sensing measurements to be reliably performed.

Implementations of the present disclosure may provide protected session-less WiFi sensing. In some aspects, a STA may not change its transmission parameters, and may communicate this to an AP, and the AP may share this information in a broadcast message such as a beacon. For example, such a broadcast message may include identifiers, such as MAC addresses, of one or more STAs whose transmission parameters do not change. These identifiers may be included in one or more information elements (IEs) included in such a broadcast message. In some other aspects, a wireless device may advertise its transmission parameters in one or more frames transmitted by the wireless device for other purposes, such as in one or more frames for data transmission. For example, the transmission parameters may be provided within a TX parameters IE and included in one or more frames transmitted by the wireless device. In some aspects, the transmission parameters may be included in a public frame included in a data aggregated medium access control (MAC) protocol data unit (MPDU), such as a public frame included in a data A-MPDU. In some other aspects, the transmission parameters may be included in a public frame transmitted as part of a transmission opportunity (TXOP). Such a public frame may be transmitted at a lower modulation and coding scheme (MCS) as compared to other transmissions of the TXOP. In some other aspects, the transmission parameters may be included in a heading physical layer convergence protocol (PLCP) protocol data unit (PPDU) of an aggregated PPDU (A-PPDU). Such a heading PPDU also may have a lower MCS as compared to other PPDUs of the A-PPDU.

Further, some aspects of the present disclosure may provide an indication of the integrity of the transmission parameters. For example, such an indication of integrity may be provided by modifying the broadcast/multicast integrity protocol (BIP) to provide an indication of an access category (AC) and traffic stream (TS) of the corresponding TXOP. Additionally, a TX parameters action frame category may be defined to include the TX parameters IE and a management message integrity code (MIC) element. This management MIC element may include a new subfield indicating the AC/TS. Accordingly, when such an action frame is used to communicate the TX parameters IE, a receiving wireless device may verify the integrity of the action frame using the management MIC.

Particular implementations of the subject matter described in this disclosure can be implemented to realize one or more of the following potential advantages. A first wireless communication device may communicate its transmission parameters to any other wireless communication devices within range, and those receiving devices may use the communicated transmission parameters for WiFi sensing without previous establishment of a WiFi sensing session. In some implementations, frames transmitted for purposes unrelated to WiFi sensing may be used for WiFi sensing after communication of the transmitting devices transmission parameters. Additionally, frames transmitted by devices within communication range may be used for WiFi sensing regardless of the BSS to which the devices belong, provided that the wireless communication devices communicate their transmission parameters to one another (or to each BSS). Further, a wireless communication device receiving a frame containing transmission parameters for WiFi sensing may verify the integrity of the communicated parameters, improving reliability of subsequent WiFi sensing operations. In addition, aspects of the example implementations may allow for better sensing of moving objects. A moving object may depart from a coverage range of a first wireless communication device, and into the coverage range of a second wireless communication device. Aspects of the sessionless wireless sensing described herein may allow for wireless sensing of the moving object to seamlessly transition from using the signals transmitted by the first wireless communication device to using the signals transmitted by the second wireless communication device.

FIG. 1 shows a block diagram of an example wireless communication network 100. According to some aspects, the example wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the example wireless communication network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistants (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication link 106, STAs 104 also can communicate directly with each other via direct wireless links 110. Additionally, two STAs 104 may communicate via a direct communication link regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control, and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing (or packet detection (PD)) is accomplished via a measurement of the received signal strength of a valid frame, which is compared to a value to determine whether the channel is busy. For example, if the received signal strength of a detected preamble is above the value, the medium is considered busy. Physical carrier sensing also includes energy detection (ED). Energy detection involves measuring the total energy the wireless communication device receives regardless of whether the received signal represents a valid frame. If the total energy detected is above a value, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the value.

The DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay, and a MAC processing time. Measurements for channel sensing are performed for each slot. All transmissions may begin at slot boundaries. Example varieties of IFS include: the short IFS (SIFS), the distributed IFS (DIFS), the extended IFS (EIFS), or the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, and 802.11be).

When the NAV reaches 0, the wireless communication device performs physical carrier sensing. If the channel remains idle for the appropriate IFS (for example, a DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of numbers that may be randomly selected for the backoff timer is referred to as the contention window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, proceed to initiate the new backoff timer. There are different CW and TXOP durations for each of the four access categories (ACs): voice (AC_VO), video (AC_VI), background (AC_BK), and best effort (AC_BE). This enables particular types of traffic to be prioritized in the network.

Figure 2:
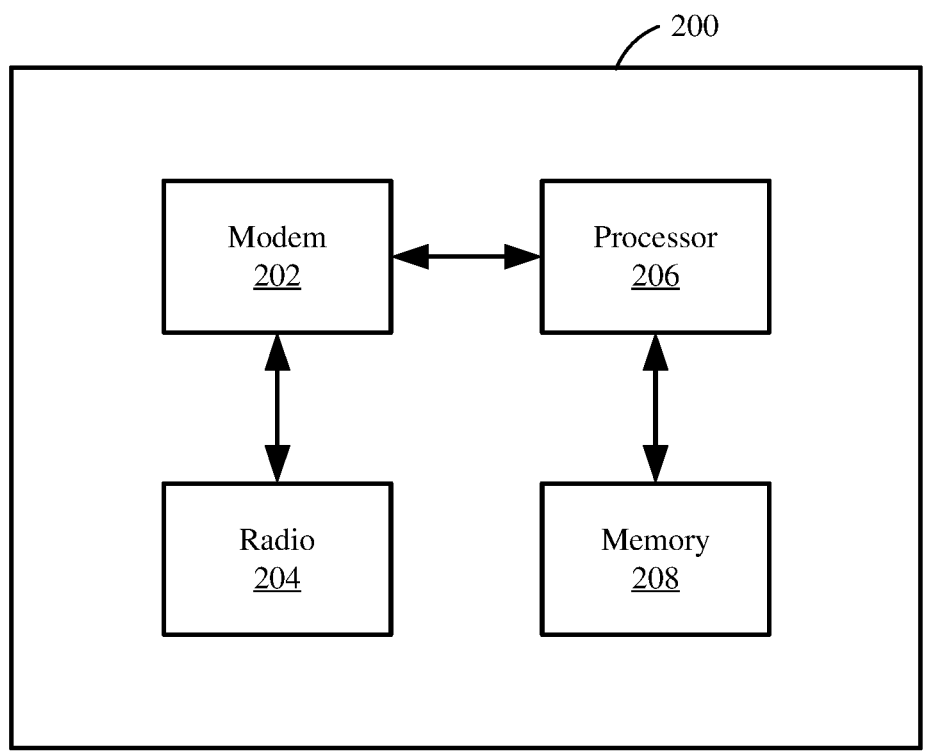
FIG. 2 shows a block diagram of an example wireless communication device.

FIG. 2 shows a block diagram of an example wireless communication device 200. In some implementations, the wireless communication device 200 can be an example of a device for use in a STA such as one of the STAs 104 described with reference to FIG. 1. In some implementations, the wireless communication device 200 can be an example of a device for use in an AP such as the AP 102 described with reference to FIG. 1. The wireless communication device 200 is capable of transmitting (or outputting for transmission) and receiving wireless communications (for example, in the form of wireless packets). For example, the wireless communication device 200 can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 200 can be, or can include, a chip, system on chip (SoC), chipset, package, or device that includes one or more modems 202, for example, a Wi-Fi (IEEE 802.11 compliant) modem. In some implementations, the one or more modems 202 (collectively "the modem 202") additionally include a WWAN modem (for example, a 3GPP 4G LTE or 5G compliant modem). In some implementations, the wireless communication device 200 also includes one or more radios 204 (collectively "the radio 204"). In some implementations, the wireless communication device 200 further includes one or more processors, processing blocks, or processing elements 206 (collectively "the processor 206"), and one or more memory blocks or elements 208 (collectively "the memory 208").

The modem 202 can include an intelligent hardware block or device such as, for example, an application-specific integrated circuit (ASIC) among other possibilities. The modem 202 is generally configured to implement a PHY layer. For example, the modem 202 is configured to modulate packets and to output the modulated packets to the radio 204 for transmission over the wireless medium. The modem 202 is similarly configured to obtain modulated packets received by the radio 204 and to demodulate the packets to provide demodulated packets. In addition to a modulator and a demodulator, the modem 202 may further include digital signal processing (DSP) circuitry, automatic gain control (AGC), a coder, a decoder, a multiplexer, and a demultiplexer. For example, while in a transmission mode, data obtained from the processor 206 is provided to a coder, which encodes the data to provide encoded bits. The encoded bits are mapped to points in a modulation constellation (using a selected MCS) to provide modulated symbols. The modulated symbols may be mapped to a number Nss of spatial streams or a number NSTS of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 204. In implementations involving beamforming, the modulated symbols in the respective spatial streams are precoded via a steering matrix prior to their provision to the IFFT block.

While in a reception mode, digital signals received from the radio 204 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for UQ imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 206) for processing, evaluation, or interpretation.

The radio 204 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 200 can include, or be coupled with, multiple transmit antennas (each with a corresponding transmit chain) and multiple receive antennas (each with a corresponding receive chain). The symbols output from the modem 202 are provided to the radio 204, which transmits the symbols via the coupled antennas. Similarly, symbols received via the antennas are obtained by the radio 204, which provides the symbols to the modem 202.

The processor 206 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 206 processes information received through the radio 204 and the modem 202, and processes information to be output through the modem 202 and the radio 204 for transmission through the wireless medium. For example, the processor 206 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 206 may generally control the modem 202 to cause the modem to perform various operations described herein.

The memory 208 can include tangible storage media such as random-access memory (RAM) or read-only memory (ROM), or combinations thereof. The memory 208 also can store non-transitory processor- or computer-executable software (SW) code containing instructions that, when executed by the processor 206, cause the processor to perform various operations described herein for wireless communication, including the generation, transmission, reception, and interpretation of MPDUs, frames, or packets. For example, various functions of components disclosed herein, or various blocks or steps of a method, operation, process, or algorithm disclosed herein, can be implemented as one or more modules of one or more computer programs.

Figure 3B:
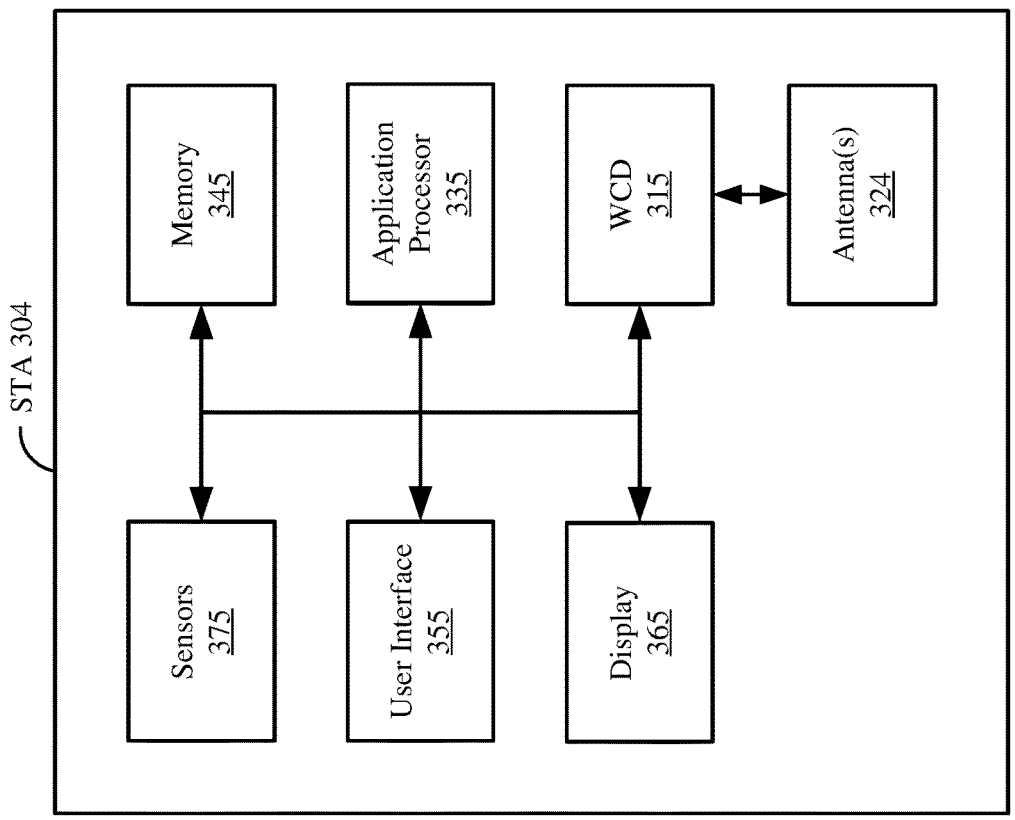
FIG. 3B shows a block diagram of an example STA.
Figure 3A:
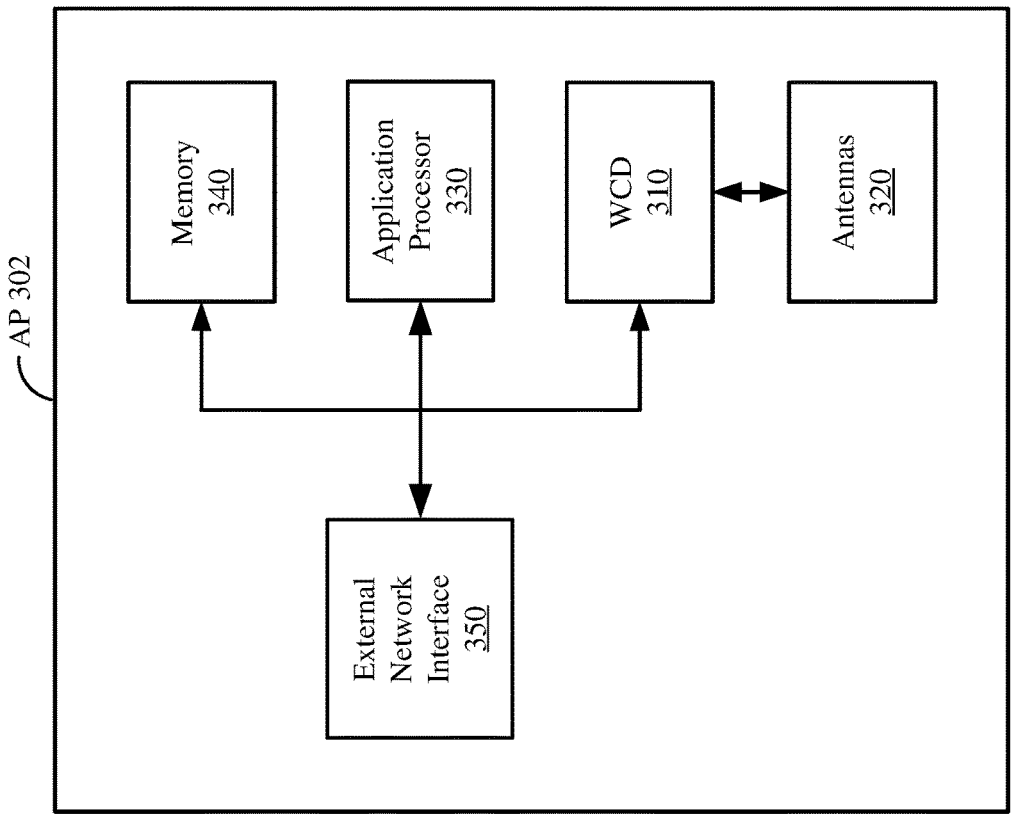
FIG. 3A shows a block diagram of an example AP.

FIG. 3A shows a block diagram of an example AP 302. For example, the AP 302 can be an example implementation of the AP 102 described with reference to FIG. 1. The AP 302 includes a wireless communication device (WCD) 310. For example, the wireless communication device 310 may be an example implementation of the wireless communication device 200 described with reference to FIG. 2. The AP 302 also includes multiple antennas 320 coupled with the wireless communication device 310 to transmit and receive wireless communications. In some implementations, the AP 302 additionally includes an application processor 330 coupled with the wireless communication device 310, and a memory 340 coupled with the application processor 330. The AP 302 further includes at least one external network interface 350 that enables the AP 302 to communicate with a core network or backhaul network to gain access to external networks including the Internet. For example, the external network interface 350 may include one or both of a wired (for example, Ethernet) network interface and a wireless network interface (such as a WWAN interface). Any of the aforementioned components can communicate with other components directly or indirectly, over at least one bus. The AP 302 further includes a housing that encompasses the wireless communication device 310, the application processor 330, the memory 340, and at least portions of the antennas 320 and external network interface 350.

FIG. 3B shows a block diagram of an example STA 304. For example, the STA 304 can be an example implementation of the STA 104 described with reference to FIG. 1. The STA 304 includes a wireless communication device 315. For example, the wireless communication device 315 may be an example implementation of the wireless communication device 200 described with reference to FIG. 2. The STA 304 also includes one or more antennas 325 coupled with the wireless communication device 315 to transmit and receive wireless communications. The STA 304 additionally includes an application processor 335 coupled with the wireless communication device 315, and a memory 345 coupled with the application processor 335. In some implementations, the STA 304 further includes a user interface (UI) 355 (such as a touchscreen or keypad) and a display 365, which may be integrated with the UI 355 to form a touchscreen display. In some implementations, the STA 304 may further include one or more sensors 375 such as, for example, one or more inertial sensors, accelerometers, temperature sensors, pressure sensors, or altitude sensors. Ones of the aforementioned components can communicate with other ones of the components directly or indirectly, over at least one bus. The STA 304 further includes a housing that encompasses the wireless communication device 315, the application processor 335, the memory 345, and at least portions of the antennas 325, UI 355, and display 365. In some other implementations, the STA 304 may include a processing system and an interface configured to perform the described functions.

Aspects of the present disclosure provide improved communications for wireless devices configured to operate in accordance with the IEEE 802.11 family of standards. Emerging versions of the IEEE 802.11 standards may support WiFi sensing, such as IEEE 802.11bf. For example, some WiFi sensing techniques may establish a session between devices to exchange transmission parameters for the frames to be used for sensing. For example, the transmission parameters may be included in one or more frames which are generated in response to a request from one or more of the devices involved in the session. Frames to be used for sensing purposes may be transmitted according to the transmission parameters, and subsequently received and measured by one or more receiving devices in the session. However, such session-based WiFi sensing systems may present a number of drawbacks. For example, frames transmitted by devices not included in an established session may not be used for sensing, even when those frames are transmitted within an environment for which WiFi sensing is desirable. Further, frames transmitted by devices in an established session, but which are transmitted for other purposes, such as for data transmission, may not be used for sensing. Further, session-based techniques may not support sessions extending across more than one BSS. Additionally, session-based techniques may not support multiple responder sessions initiated by non-AP devices, and thus many frames transmitted are not used for sensing, requiring the transmission of additional frames for sensing purposes, which may lead to congestion.

Further, it may be desirable to verify the integrity of frames used for exchanging transmission parameters, in order to reduce the risk of man-in-the-middle attacks on WiFi sensing systems. That is, if another device transmits one or more frames purporting to advertise transmission parameters for wireless sensing, it may be desirable to verify the integrity of those transmission parameters in order for accurate sensing measurements to be reliably performed.

Figure 4:
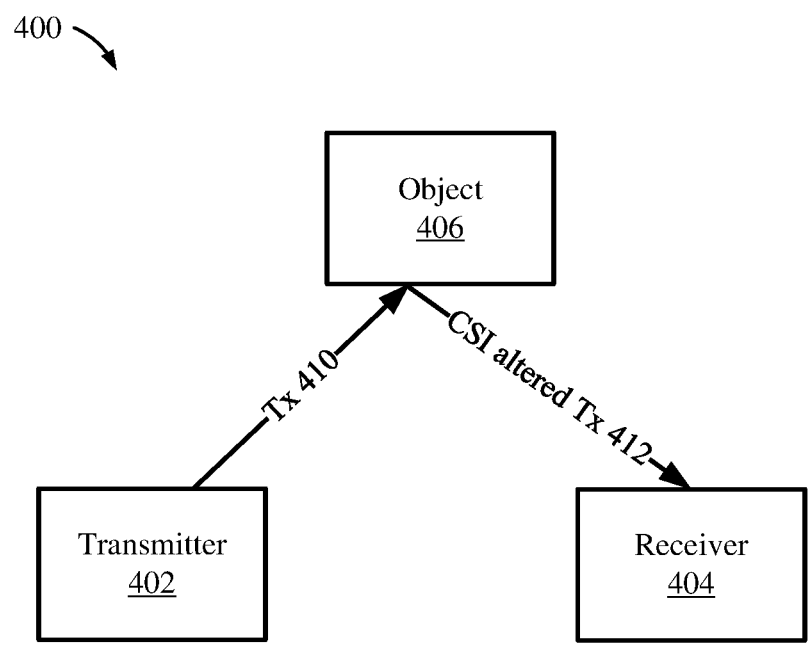
FIG. 4 shows an example wireless sensing system.

FIG. 4 shows an example wireless sensing system 400. With respect to FIG. 4, the wireless sensing system 400 is shown to include a transmitting device 402, a receiving device 404, and an object 406. The transmitting device may be any suitable device capable of transmitting wireless signals, such as the AP 102 or STA 104 of FIG. 1, or the wireless communication device 200 of FIG. 2. The receiving device 404 may be any suitable device capable of receiving wireless signals, such as the AP 102 or STA 104 of FIG. 1, or the wireless communication device 200 of FIG. 2. The object 406 may be an object in the vicinity of the transmitting device 402 and the receiving device 404, such as a wall, a piece of furniture, a person or animal, or any suitable object capable of affecting the CSI of transmitted wireless signals, for example by deflection, reflection, and so on. Note that while FIG. 4 shows a signal having its CSI altered by the object 406 by reflection, that detectable changes in CSI of transmitted wireless signals may occur without reflection, for example, the object 406 may block part of a transmitted signal, resulting in the receiving device 404 detecting a signal having lower power than would be detected without the presence of the object 406. In one example, the transmitting device 402 may transmit a transmission 410, and the CSI of the transmission 410 may be affected by the object 406, for example deflecting or reflecting off of the object 406 and be received at the receiving device 404 as CSI altered Tx 412. Note that while FIG. 4 shows the transmitting device 402 and the receiving device 404 as separate, in some aspects, a transmitting device also may receive one or more reflections of its own transmissions and perform wireless sensing based on those received reflections. Further, note that while FIG. 4 shows only a single transmitting device 402 and a single receiving device 404, other wireless sensing systems may have any number of transmitting and receiving devices.

A receiving device, such as receiving device 404, may use any suitable techniques may be used to detect and process changes in the CSI of received signals, such as reflection 412, in addition to changes in CSI due to blocking, deflection, and so on which may be caused by nearby objects. Changes in CSI may be detected, for example, based on a cross-correlation of one or more sequences in transmitted frames (such as in a channel estimation field). The detection may be based on the cross-correlation (CC) results. The detection and processing may also be based on subtraction of normalized CSI, for example based on measurements on different frames or training sequences. For example, the CC may be performed to detect reflections and scatters surrounding the receiving device 404. Changes in CSI due to these deflections, reflections, and so on may appear as a new tap in the CC output. The receiving device 404 may generate (such as based on the CC results) a table including a distance, angle, material classification, and speed for each target (such as a detected object 406). Distance may be determined, for example, by measuring a round trip time for a transmitted signal to return to the receiving antenna of the receiving device 404. In some cases, a sensing device may determine an angle or arrival of a reflected frame, and based on the angle of arrival, the receiving device 404 may generate position information or three dimensional measurement information (such as based on a known location of transmitting device 402, the receiving device 404, or object 406). In some cases, the receiving device 404 may determine a direction of motion of an object, such as object 406. In some cases, multiple sensing devices may provide raw measurement data for a central device (such as an AP) to process and determine position sensor data (such as position/location/direction). In some aspects, one or more machine learning (ML) models may be used for correlating changes in CSI with aspects of the detected object 406, such as a position, distance, material classification, speed, and so on.

Session-based WiFi sensing techniques may have significant limitations as to which wireless devices and which wireless transmissions may be used for sensing measurements. For example, a WiFi sensing session may be restricted to a single BSS, such that other wireless devices outside of the BSS but within transmission range of the BSS cannot participate in the WiFi sensing session. Further, frames transmitted for non-sensing purposes may not be used for sensing.

Figure 5:
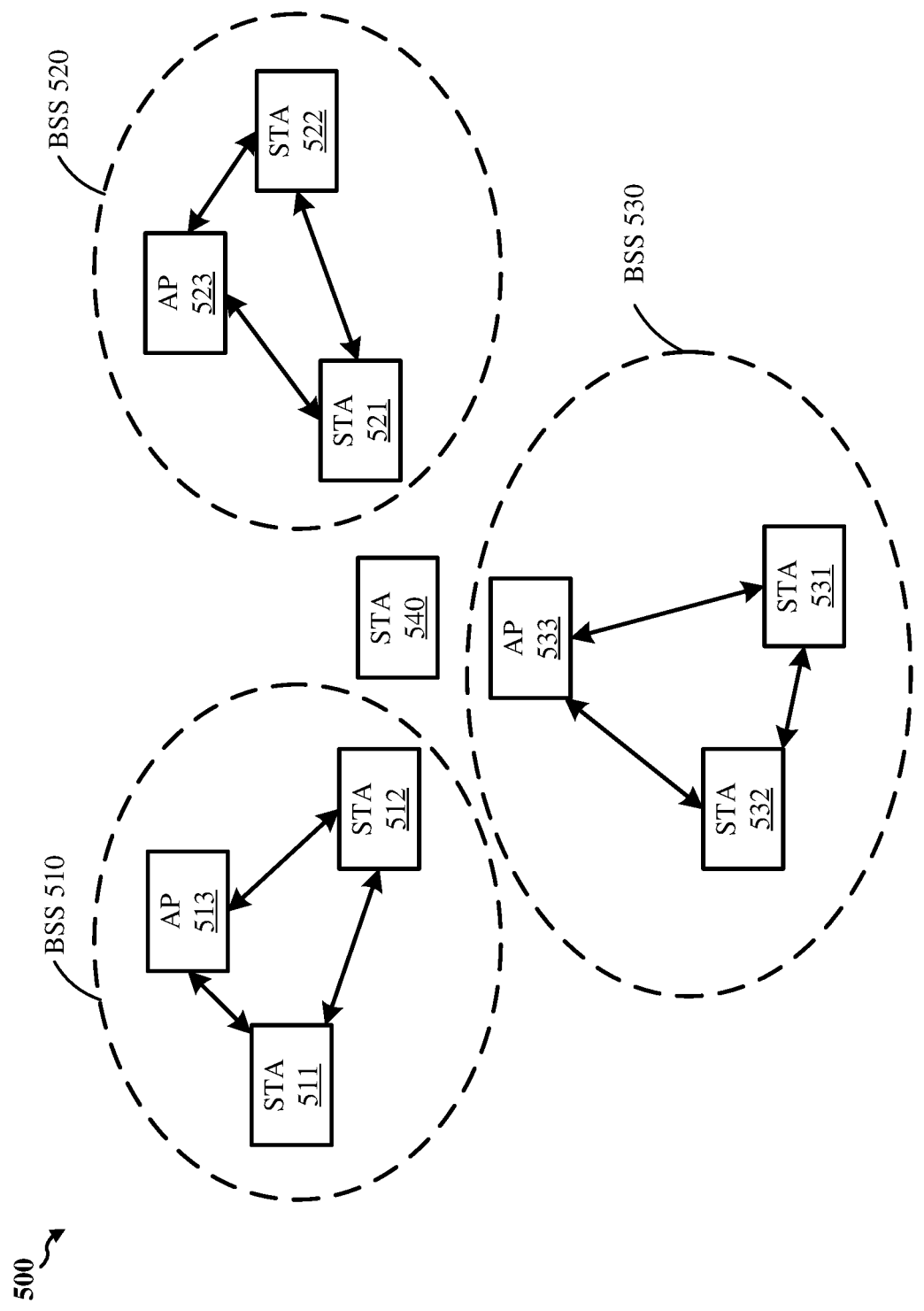
FIG. 5 shows a diagram of three BSSs and their associated STAs.

FIG. 5 shows a diagram 500 of three BSSs 510, 520, and 530 and their associated STAs. In the example of FIG. 5, each of the STAs belongs to only one BSS. In some implementations, the diagram 500 may be an overhead diagram depicting relative locations of the wireless devices. A first BSS 510 may include STAs 511 and 512 and an AP 513, a second BSS 520 may include STAs 521 and 522 and an AP 523, while a third BSS 530 may include STAs 531 and 532 and an AP 533. The STA 540 may be within transmission range of one or more devices belonging to BSSs 510-530, but is not associated with any of these BSSs. For session-based WiFi sensing techniques, a first session may be established among one or more devices belonging to BSS 510, a second session may be established among one or more devices belonging to BSS 520, and a third session may be established among one or more devices belonging to BSS 530. However, transmission from devices in one BSS may not be used for sensing by devices in the other BSSs. For example, STA 521 may be capable of receiving transmissions from STA 512, AP 533, and STA 540, but these signals may not be used for sensing, because session-based WiFi sensing techniques may not support sessions extending across multiple BSSs.

Implementations of the subject matter disclosed herein may remove the requirement for a session to be established prior to sensing. Such techniques may be called sessionless WiFi sensing techniques. For example, sessionless WiFi sensing techniques may allow wireless devices to include information about transmission parameters in other transmissions, including transmission for other non-sensing purposes, such as data transmissions. A receiving device may receive such transmissions and use the information about transmission parameters for WiFi sensing measurements. For example, the included information may indicate one or more transmission parameters for one or more wireless devices, and the receiving device may subsequently receive one or more transmissions from one of these one or more wireless devices and make one or more wireless sensing measurements for the subsequently received transmissions based on the transmission parameters. Sessionless WiFi sensing techniques may therefore not be restricted to devices within a single BSS and may use a wider variety of transmitted frames for making sensing measurements.

Figure 6:
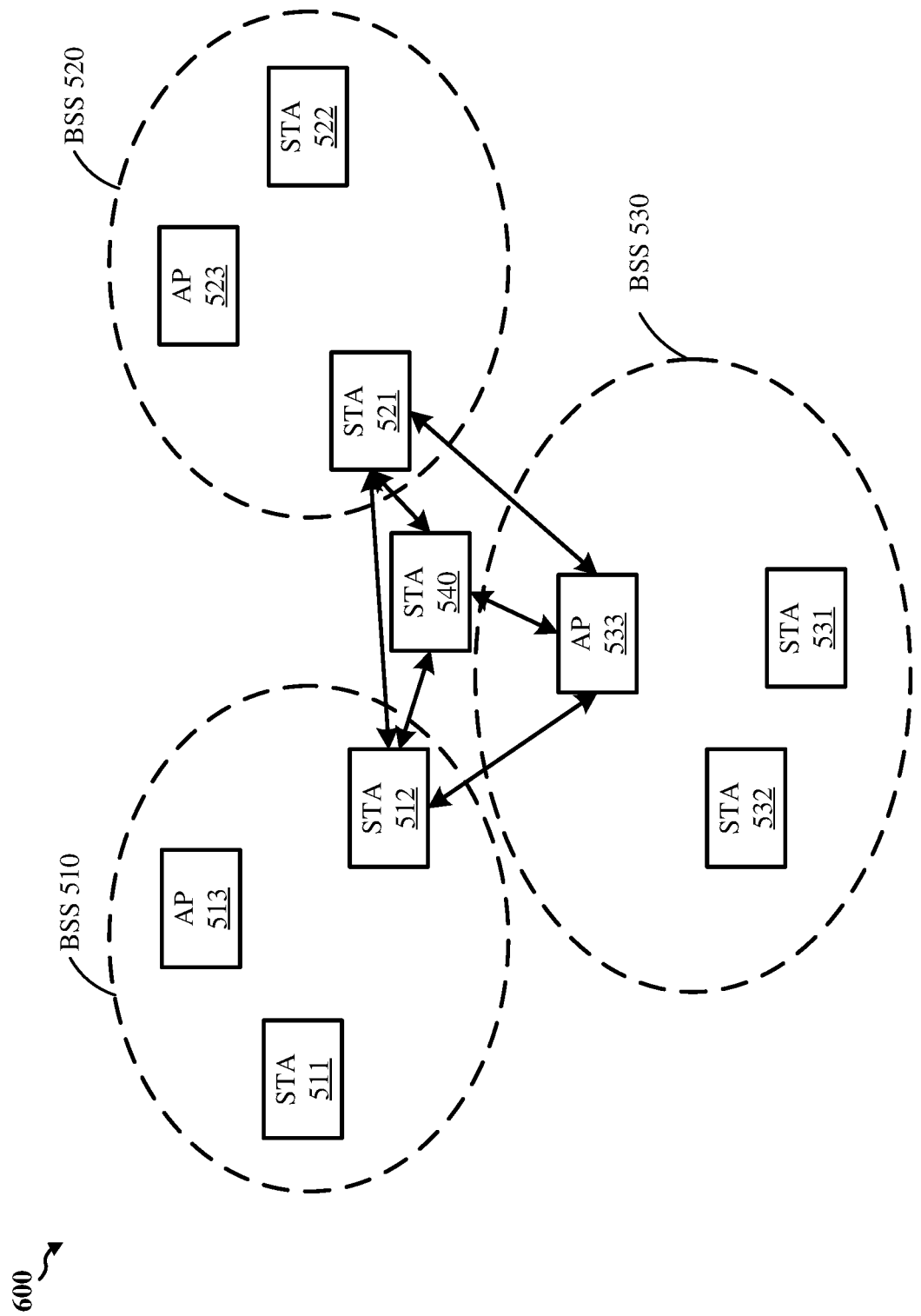
FIG. 6 shows another diagram of three BSSs and their associated STAs.

FIG. 6 shows a diagram 600 showing a plurality of wireless devices, each belonging to at most one BSS, illustrating some benefits of sessionless techniques for WiFi sensing. FIG. 6 shows the same wireless devices and BSSs as depicted in FIG. 5; however, sessionless WiFi sensing techniques may allow more wireless devices to exchange signals for sensing, and for a wider variety of transmitted frames to be used for sensing measurements. For example, STA 512, STA 521, AP 533, and STA 540 may be within communication range of each other. Information about transmission parameters may be exchanged, in one or more transmission (TX) parameter information elements (IEs), and subsequent transmissions by one of these wireless devices may be received by the other wireless devices and used for WiFi sensing measurements.

Figure 7A:
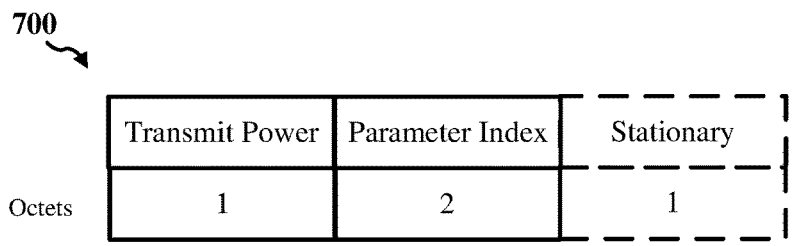
FIG. 7A shows an example TX parameter IE which may be used for communicating transmission parameters.

FIG. 7A shows an example TX parameter IE 700 which may be used for communicating transmission parameters. With regard to FIG. 7A, the TX parameter IE may include a transmit power field and a parameter index field. For example, the transmit power field may include one byte (8 bits or one octet), and the parameter index field may include 2 bytes (16 bits or two octets). The transmit power field may indicate a transmission power for the wireless device transmitting a frame including the TX parameter IE 700. This transmission power may be expressed in any suitable manner, such as an absolute transmission power, an index corresponding to a transmission power, and so on. The parameter index may indicate changes in one or more transmission parameters of transmissions of the wireless device transmitting a frame including the TX parameter IE 700. The parameter index may indicate changes in transmission parameters such as MIMO precoding, information about beamforming and antenna selection, and so on. When the index is unchanged with respect to a previously transmitted TX parameter IE, the transmission parameters are indicated to be unchanged. Such transmission parameters also may indicate that the device transmitting the TX parameter IE has moved since the device previously transmitted a TX parameter IE. For example, this indication may indicate whether or not the device has moved at least a threshold distance since the previous TX parameter IE was transmitted. In some aspects, the parameter index subfield may be a counter, such as a free-running counter, which increases in value by a known amount, such as one, each time one of the transmission parameters for a transmitted frame is changed with respect to a previous transmission addressed to a same target. In some aspects, the parameter index may also increase when the transmitting device has moved with respect to a position where the transmitting device transmitted the previous transmission. The TX parameter IE 700 may optionally include a stationary field, indicating whether or not the transmitting device has moved since the previous transmission, or whether the transmitting device has been stationary since the previous transmission.

Figure 7B:
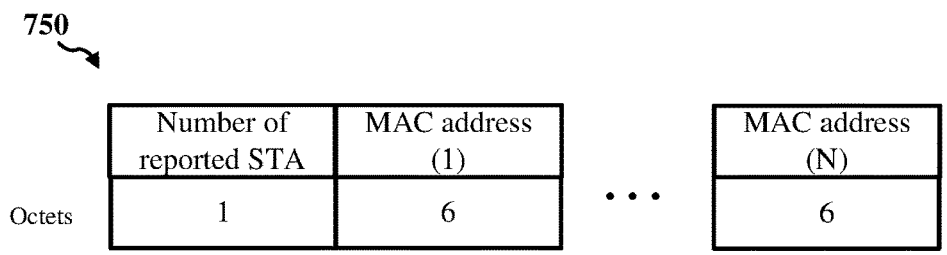
FIG. 7B shows another example TX parameter IE which may be used for indicating transmission parameters.

FIG. 7B shows another example TX parameter IE 750 which may be used for indicating transmission parameters. While the TX parameter IE 700 indicated transmission parameters for a single wireless device, the TX parameter IE 750 may indicate that a number of wireless devices have constant transmission parameters. For example, one or more STAs may indicate to an AP that their transmission parameters do not change, and the AP may broadcast an indication of the unchanging transmission parameters. For example, TX parameter IE 750 may include a number of reported STA field having one byte. The value of the number of reported STA field indicates the number of MAC address fields which follow, each MAC address field indicating an address of a corresponding STA whose transmission parameters do not change. The TX parameter IE 750 may be communicated in a broadcast, such as in a beacon or another broadcast by the AP. A device receiving the broadcast may determine that the STAs whose addresses are indicated in the MAC address fields have unchanging transmission parameters. Relative differences in CSI between subsequently received frames from one of the indicated STAs may be used for WiFi sensing measurements.

Note that the example implementations are not limited to the specific field formats of the TX parameter IE 700 and TX parameter IE 750, but that the TX parameter IE may have any suitable field format for indicating the transmission parameters.

Figure 8A:
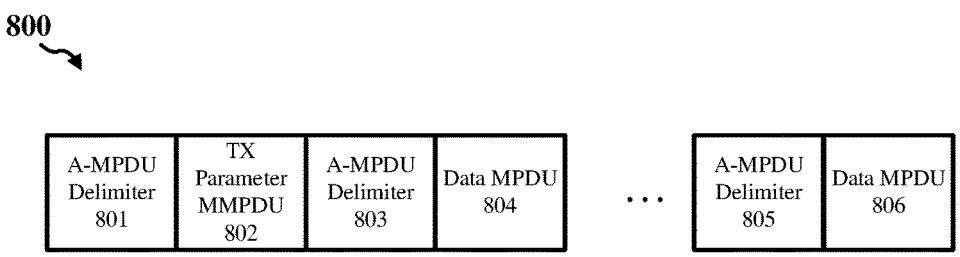
FIG. 8A shows an example format for a data A-MPDU including a frame communicating a TX parameter IE.

A wireless device communicating its own transmission parameters in a TX parameter IE, such as TX parameter IE 700, may include the TX parameter IE in any of a number of suitable transmissions. For example, the TX parameter IE 700 may be included in a public frame of a data A-MPDU transmitted by the wireless device. For example, FIG. 8A shows an example format 800 for a data A-MPDU including a frame communicating a TX parameter IE, according to some example implementations. With respect to FIG. 8A, the A-MPDU may include a first A-MPDU delimiter 801, a TX parameter MAC management protocol data unit (MMPDU) 802, and one or more pairs of A-MPDU delimiters and data MPDUs, such as A-MPDU delimiter 803/data MPDU 804 and A-MPDU delimiter 805/data MPDU 806. The TX parameter MMPDU 802 may be a public frame including the TX parameter IE, such as TX parameter IE 700. An example frame format of the TX parameter MMPDU is described with respect to FIGS. 9A and 9B.

Figure 8B:
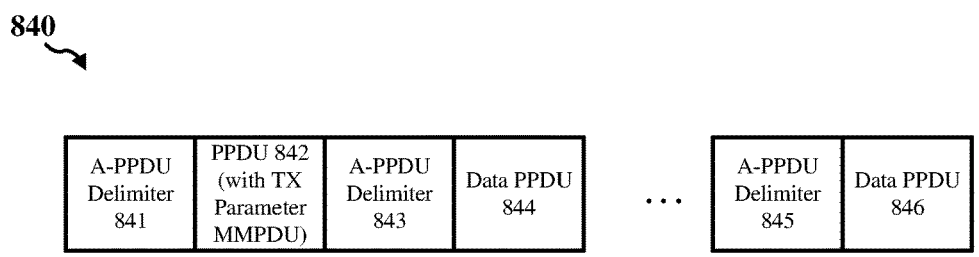
FIG. 8B shows an example format for an A-PPDU communicating the TX parameter IE.

In another aspect, the TX parameter IE may be included in a public frame included in a heading PPDU of an A-PPDU. For example, the heading PPDU may include the TX parameter MMPDU 802 described with respect to FIG. 8A. FIG. 8B shows an example format 840 for an A-PPDU communicating the TX parameter IE, according to some implementations. As shown in FIG. 8B, the A-PPDU may include an A-PPDU delimiter 841, a PPDU 842 including the TX parameter MMPDU, and one or more pairs of A-PPDU delimiters and data PPDUs, such as A-PPDU delimiter 843/data PPDU 844, and A-PPDU delimiter 845/data PPDU 846.

Figure 8C:
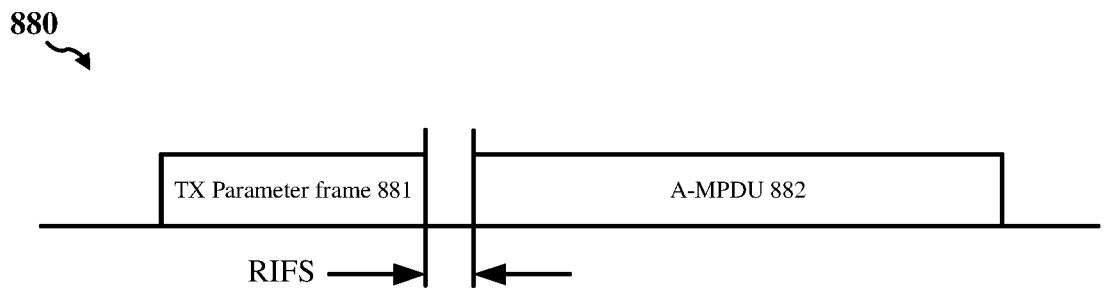
FIG. 8C shows an example TXOP, during which TX parameters may be communicated.

In another aspect, the TX parameter IE may be transmitted as part of a transmission opportunity (TXOP) and may be transmitted in advance of data transmitted during the TXOP. For example, a TX parameter frame, such as the TX parameter MMPDU, may be transmitted in advance of an A-MPDU transmitted during the TXOP. FIG. 8C shows an example TXOP 880, during which TX parameters may be communicated, according to some implementations. As shown in FIG. 8C, the TXOP 880 may begin with transmission of the TX parameter frame 881, which may be the TX parameter MMPDU. A short delay, such as a reduced interframe space (RIFS) may follow before transmission of the A-MPDU 882. In some aspects, the TX parameter frame 881 may be transmitted at a reduced MCS as compared to the MCS used for transmission of the A-MPDU 882. This reduced MCS may be a basic MCS.

After the TX parameters are communicated for one or more wireless devices, for example using one or more frames including a TX parameter IE such as TX parameter IE 700 or 750, the TX parameters may be used for WiFi sensing measurements for subsequent frames transmitted by the one or more wireless devices. For example, after receiving the A-MPDU 800 or A-PPDU from a transmitting device, a receiving device may determine the transmission parameters based on TX parameter MMPDU 802 or the PPDU 842 and use subsequent transmissions from the transmitting device for sensing measurements. Similarly, after receiving the TX parameter frame 881 from a transmitting device, a receiving device may determine the transmission parameters and use the PPDU containing the A-MPDU 882 for sensing measurements. Note that WiFi sensing measurements may be made based on the subsequent transmissions regardless of whether or not the subsequent transmissions are decoded. For example, the WiFi sensing measurements may be based on MPDUs of the A-MPDU 882 regardless of whether or not all the MPDUs in A-MPDU 882 are decoded.

In some implementations, it may be desirable to verify the integrity of frames used for exchanging transmission parameters, in order to reduce the risk of man-in-the-middle attacks on WiFi sensing systems. That is, if another device transmits one or more frames purporting to advertise transmission parameters for wireless sensing, it may be desirable to verify the integrity of those transmission parameters in order for accurate sensing measurements to be reliably performed. Accordingly, further aspects of the present disclosure provide methods and systems for verifying the integrity of transmission parameters communicated for wireless sensing.

Some known systems provide protection of multiply addressed management frames through authentication of the frame's payload. However, such solutions are not helpful for protecting transmission parameters for WiFi sensing, because they do not allow verification of the integrity of the receiving address (RA) or transmitting address (TA) of the frame. Such protection is important for WiFi sensing, as different transmitting devices (STAs or APs) may have differing transmission parameters, and even the same device may have changing transmission parameters.

Aspects of the present disclosure allow for verification of the integrity of TX parameters for WiFi sensing by appending a message integrity code (MIC) to the frames used for sending the TX parameters IE in such a way that third party receiving devices may verify the MIC sent by a transmitting device before using transmissions for sensing measurements.

More particularly, the example implementations may modify the broadcast/multicast integrity protocol (BIP) to provide an indication of the access category (AC) and traffic stream (TS) of the TXOP used for transmitting the TX parameters IE by adding a field to a management MIC element of the frame used for transmitting the TX parameters IE (for example, the TX parameter MMPDU 802). Additionally, a new category of action frame may be defined to include the TX parameters IE and the management MIC element.

Figure 9A:
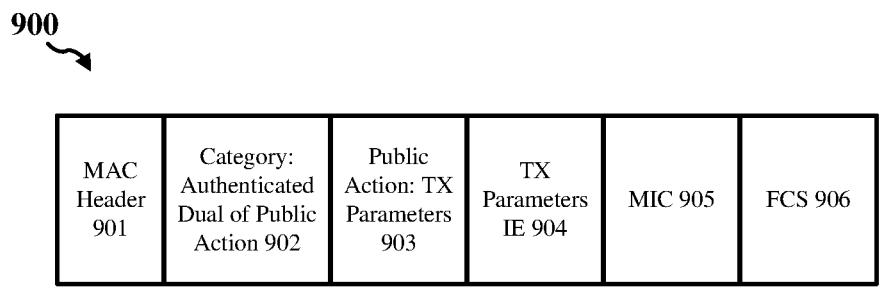
FIG. 9A shows an example frame format for an authenticated TX parameters frame.

FIG. 9A shows an example frame format 900 for an authenticated TX parameters frame. The authenticated TX parameters frame is shown to include a MAC header 901, a category field 902 indicating the category authenticated dual of public action, a public action field 903 indicating that the action frame is a TX parameters frame, a TX parameters IE 903, a management MIC element 905, and an FCS 906. The category authenticated dual of public action allows the integrity provided by the management MIC element 905 to be applied to frames to be sent within and outside of the BSS to which a transmitting device is associated. The TX parameters frame is a frame type belonging to the category authenticated dual of public action.

.shows an example frame format 950 for a management MIC element. For example, the frame format 950 may be a frame format for the management MIC element 905 of FIG. 9A. The frame format 950 includes an element ID field 951 indicating the ID of the management MIC element, a length field 952 indicating length of the management MIC element, an AC/TS field 953 indicating the AC/TS of the authenticated TX parameters frame, a Key ID field 954 indicating one or more keys associated with calculation of the MIC, a PN field 955 indicating a packet number of the authenticated TX parameters frame, and a MIC field 956 indicating the MIC of the authenticated TX parameters frame.

Figure 9B:
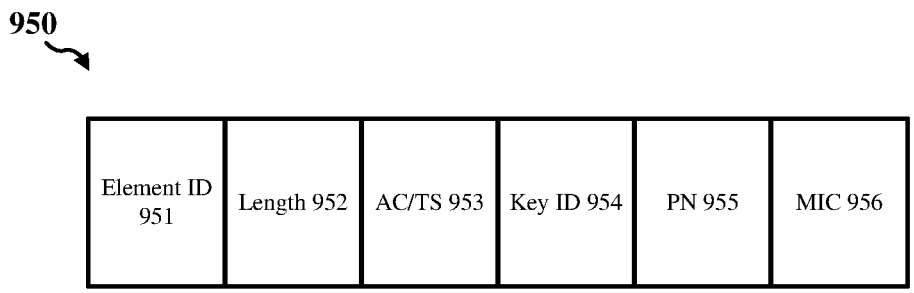
FIG. 9B shows an example frame format for a management MIC element.

In addition, providing integrity protection for the AC/TS, for example by including the AC/TS field 953 in the management MIC element, as shown with respect to FIG. 9B, may be desirable for legacy devices to benefit from the protection of the TX parameters. More particularly, some legacy devices may not be able to perform packet number (PN) generation and MIC-related integrity calculations in legacy hardware (HW). In some aspects, the MIC calculation may be performed by software (SW), while the TX parameters frame may be delivered to the legacy device's HW through regular data frames flow. These data frames may be organized and send in separate queues per AC/TS. Thus, while the TX parameters frame is generated by the SW, including the MIC calculation, the actual order of transmission is not yet known, for example due to the priority quality of service access to the wireless medium. Accordingly, some PNs generated by the SW may be sent and received out of order, particularly when generated as a single sequence. Accordingly, in some aspects, PNs may be generated separately for each AC/TS queue, and the AC/TS field 953 thus indicates to which sequence of PNs the PN in the PN field 955 belongs. This may allow protection of the TX parameters frame even for legacy devices.

Figure 10:
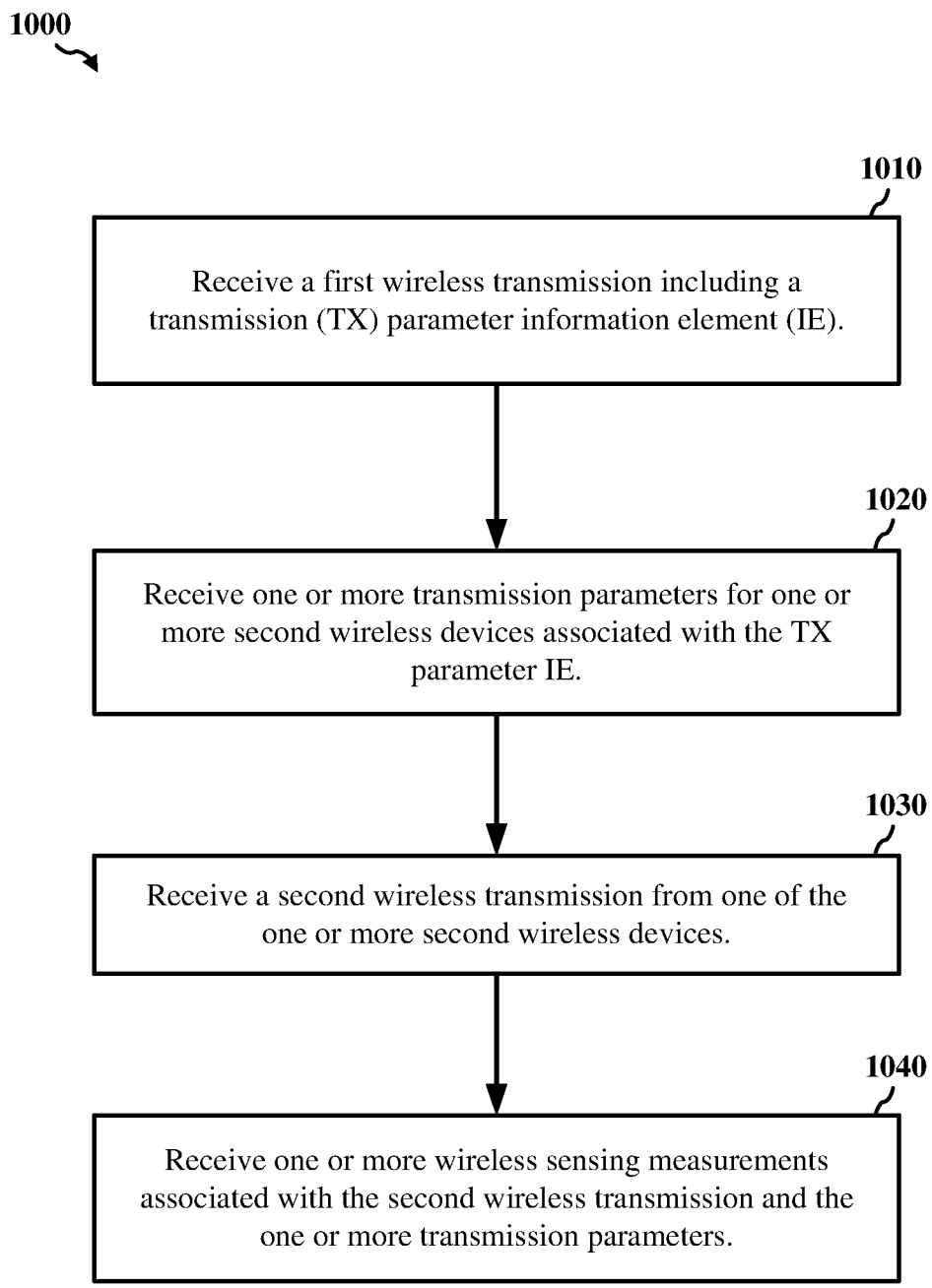
FIG. 10 shows a flowchart illustrating another example operation for wireless communication that supports sessionless wireless sensing.

FIG. 10 shows a flowchart illustrating an example operation 1000 for wireless communication that supports sessionless wireless sensing. In some implementations, the operation 1000 may be performed by a wireless communication device operating as or within an AP, such the AP 102 of FIG. 1, the wireless communication device 200 of FIG. 2 or the AP 302 of FIG. 3A. In some other implementations, the operation 1000 may be performed by a wireless communication device operating as or within a STA, such as the STA 104 of FIG. 1, the wireless communication device 200 of FIG. 2, or the STA 304 of FIG. 3B.

For example, at block 1010, the wireless communication device 200 receives a first wireless transmission including a transmission (TX) parameter information element (IE). At block 1020, the wireless communication device 200 obtains one or more transmission parameters for one or more second wireless communication devices associated with the TX parameter IE. At block 1030, the wireless communication device 200 receives a second wireless transmission from one of the one or more second wireless communication devices. At block 1040, the wireless communication device 200 obtains one or more wireless sensing measurements associated with the second wireless transmission and the one or more transmission parameters.

In some implementations, the wireless communication device 200 further verifies an integrity of the TX parameter IE associated with a message integrity code (MIC) in the first wireless transmission. In some aspects, the MIC is configured to verify an integrity of at least an access category (AC), or traffic stream (TS field) associated with the first wireless transmission.

In some aspects, the first wireless transmission is received from an access point (AP), and the TX parameter IE indicates that each of the at least one second wireless communication devices have static transmission parameters. In some aspects, the first wireless transmission is a broadcast transmission.

In some aspects, the first wireless transmission includes a frame received from a station (STA), and the second wireless transmission is received from the STA. In some aspects, the frame is included in an aggregated media access control (MAC) protocol data unit (A-MPDU). In some aspects, the frame is included in an initial physical layer (PHY) protocol data unit (PPDU) of an aggregated PPDU (A-PPDU). In some aspects, the frame is a public frame transmitted at a basic modulation and coding scheme (MCS).

In some aspects, the TX parameter IE is received with each transmission received from the STA. In some aspects, the TX parameter IE is received periodically from the STA.

In some aspects, the TX parameter IE indicates a transmit power of the STA. In some aspects the TX parameter IE indicates one or more of changes in multiple-input multiple-output (MIMO) precoding used by the STA and changes in beamforming and antenna selection settings used by the STA. In some aspects an index in the TX parameter IE indicates changes in the MIMO precoding or beamforming and antenna selection settings used by the STA.

In some aspects, the TX parameters IE indicates whether or not the STA has moved since the STA transmitted a previous frame including a TX parameter IE.

Figure 11:
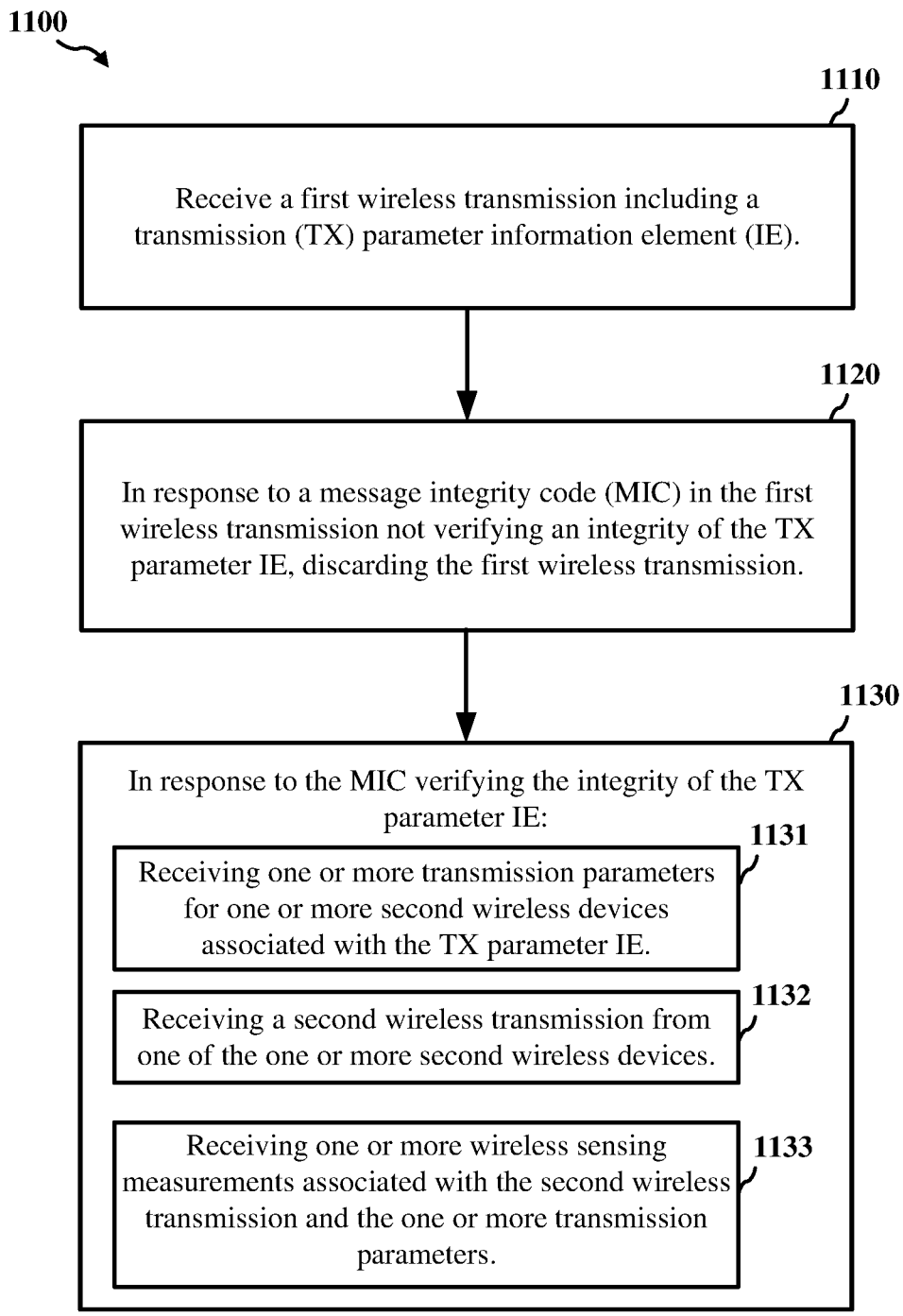
FIG. 11 shows a flowchart illustrating another example operation for wireless communication that supports sessionless wireless sensing.

FIG. 11 shows a flowchart illustrating an example operation 1100 for wireless communications that supports sessionless wireless sensing. In some implementations, the operation 1100 may be performed by a wireless communication device operating as or within an AP, such the AP 102 of FIG. 1, the wireless communication device 200 of FIG. 2 or the AP 302 of FIG. 3A. In some other implementations, the operation 1100 may be performed by a wireless communication device operating as or within a STA, such as the STA 104 of FIG. 1, the wireless communication device 200 of FIG. 2, or the STA 304 of FIG. 3B.

For example, at block 1110, the wireless communication device 200 receives a first wireless transmission including a TX parameter IE. At block 1120, in response to a message integrity code (MIC) in the first wireless transmission not verifying an integrity of the TX parameter IE, the wireless communication device 200 discards the first wireless transmission. In block 1130, in response to the MIC verifying the integrity of the TX parameter IE, the wireless communication device 200 obtains one or more transmission parameters for one or more second wireless communication devices associated with the TX parameter IE (1131), receives a second wireless transmission from one of the one or more second wireless communication devices (1132), and obtains one or more wireless sensing measurements associated with the second wireless transmission and the one or more transmission parameters (1133).

In some aspects, the MIC is configured to verify an integrity of at least an access category (AC), or traffic stream (TS field) associated with the first wireless transmission.

In some aspects, the first wireless transmission is received from an access point (AP), and the TX parameter IE indicates that each of the at least one second wireless communication devices have static transmission parameters. In some aspects, the first wireless transmission is a broadcast transmission.

In some aspects, the first wireless transmission includes a frame received from a station (STA), and the second wireless transmission is received from the STA. In some aspects, the frame is included in an aggregated media access control (MAC) protocol data unit (A-MPDU). In some aspects, the frame is included in an initial physical layer (PHY) protocol data unit (PPDU) of an aggregated PPDU (A-PPDU). In some aspects, the frame is a public frame transmitted at a basic modulation and coding scheme (MCS).

In some aspects, the TX parameter IE is received with each transmission received from the STA. In some aspects, the TX parameter IE is received periodically from the STA.

In some aspects, the TX parameter IE indicates a transmit power of the STA. In some aspects the TX parameter IE indicates one or more of changes in multiple-input multiple-output (MIMO) precoding used by the STA and changes in beamforming and antenna selection settings used by the STA. In some aspects an index in the TX parameter IE indicates changes in the MIMO precoding or beamforming and antenna selection settings used by the STA.

In some aspects, the TX parameters IE indicates whether or not the STA has moved since the STA transmitted a previous frame including a TX parameter IE.

Implementation examples are described in the following numbered clauses:

1. A first wireless communication device, including:
    an interface configured to:
        obtain a first wireless transmission including a transmit (TX) parameter information element (IE); and
        obtain a second wireless transmission; and a processing system configured to:
        obtain one or more transmission parameters for one or more second wireless communication devices associated with the TX parameter IE; and
        obtain one or more wireless sensing measurements associated with the second wireless transmission and the one or more transmission parameters.
2. The first wireless communication device of clause 1, where the processing system is further configured to verify an integrity of the TX parameter IE associated with a message integrity code (MIC) in the first wireless transmission.
3. The first wireless communication device of clause 2, where the MIC is configured to verify an integrity of at least an access category (AC) or traffic stream (TS field) associated with the first wireless transmission.
4. The first wireless communication device of any of clauses 1-2, where the first wireless transmission is obtained from an access point (AP), the TX parameter IE indicates that the one or more second wireless communication devices have static transmission parameters, and the second wireless transmission is received from one of the one or more second wireless communication devices.
5. The first wireless communication device of any of clauses 1-4, where the first wireless transmission includes a frame obtained from a non-AP station (STA).
6. The first wireless communication device of clause 5, where the frame is included in an aggregated media access control (MAC) protocol data unit (A-MPDU).
7. The first wireless communication device of any of clauses 5-6, where the frame includes an initial physical layer (PHY) protocol data unit (PPDU) of an aggregated PPDU (A-PPDU).
8. The first wireless communication device of any of clauses 5-7, where the frame includes a public frame transmitted by the STA at a basic modulation and coding scheme (MCS).
9. The first wireless communication device of any of clauses 5-8, where the TX parameter IE is obtained with each transmission received from the non-AP STA.
10. The first wireless communication device of any of clauses 5-9, where the TX parameter IE is obtained periodically from the non-AP STA.
11. The first wireless communication device of any of clauses e 5-10, where the TX parameter IE indicates a transmit power of the non-AP STA.
12. The first wireless communication device of any of clauses 5-11, where the TX parameter IE indicates one or more of changes in multiple input multiple-output (MIMO) precoding used by the non-AP STA, and changes in beamforming and antenna selection settings used by the non-AP STA.
13. The first wireless communication device of clause 12, where an index in the TX parameter IE indicates a change in the MIMO precoding or beamforming and antenna selection settings used by the non-AP STA.
14. The first wireless communication device of any of clauses 5-13, where the TX parameter IE indicates whether or not the non-AP STA has moved since the non-AP STA transmitted a previous frame including a TX parameter IE.
15. A method for wireless communication performed by an apparatus of a first wireless communication device, the method including:
    receiving a first wireless transmission including a transmit (TX) parameter information element (IE);
    receiving one or more transmission parameters for one or more second wireless communication devices associated with the TX parameter IE;
    receiving a second wireless transmission from one of the one or more second wireless communication devices;
    receiving one or more wireless sensing measurements associated with the second wireless transmission and the one or more transmission parameters.
16. The method of clause 15, further including verifying an integrity of the TX parameter IE associated with a message integrity code (MIC) in the first wireless transmission.
17. The method of clause 16, where the MIC is configured to verify an integrity of at least an access category (AC) or traffic stream (TS field) associated with the first wireless transmission.

18. The method of any of clauses 15-16, where the first wireless transmission is received from an access point (AP), the TX parameter IE indicates that each of the one or more second wireless communication devices have static transmission parameters.
19. The method of any of clauses 15-18, where the first wireless transmission includes a frame received from a non-AP station (STA), and the second wireless transmission is received from the non-AP STA.
20. The method of clause 19, where the frame is included in an aggregated media access control (MAC) protocol data unit (A-MPDU).
21. The method of any of clauses 19-20, where the frame includes an initial physical layer (PHY) protocol data unit (PPDU) of an aggregated PPDU (A-PPDU).
22. The method of any of clauses 19-21, where the frame includes a public frame transmitted at a basic modulation and coding scheme (MCS).
23. The method of any of clauses 19-22, where the TX parameter IE is received with each transmission received from the non-AP STA.
24. The method of any of clauses 19-23, where the TX parameter IE is received periodically from the non-AP STA.
25. The method of any of clauses 19-24, where the TX parameter IE indicates a transmit power of the non-AP STA.
26. The method of any of clauses 19-25, where the TX parameter IE indicates one or more of changes in multiple-input multiple-output (MIMO) precoding used by the non-AP STA and changes in beamforming and antenna selection settings used by the non-AP STA.
27. The method of clause 26, where an index in the TX parameter IE indicates changes in the MIMO precoding or beamforming and antenna selection settings used by the non-AP STA.
28. The method of any of clauses 19-27, where the TX parameter IE indicates whether or not the non-AP STA has moved since the non-AP STA transmitted a previous frame including a TX parameter IE.
29. A non-transitory computer-readable storage medium storing instructions, that, when executed by one or more processors of a first wireless communication device, cause the first wireless communication device to perform operations including:
receiving a first wireless transmission including a transmit (TX) parameter information element (IE);
receiving one or more transmission parameters for one or more second wireless communication devices associated with the TX parameter IE;
receiving a second wireless transmission from one of the one or more second wireless communication devices;
receiving one or more wireless sensing measurements associated with the second wireless transmission and the one or more transmission parameters.
30. A method for wireless communication performed by an apparatus of a first wireless communication device, including:
receiving a first wireless transmission including a transmit (TX) parameter information element (IE);
in response to a message integrity code (MIC) in the first wireless transmission not verifying an integrity of the TX parameter IE, discarding the first wireless transmission;
in response to the MIC verifying the integrity of the TX parameter IE:

receiving one or more transmission parameters for one or more second wireless communication devices associated with the TX parameter IE;
receiving a second wireless transmission from one of the one or more second wireless communication devices; and
receiving one or more wireless sensing measurements associated with the second wireless transmission and the one or more transmission parameters.
31. The method of clause 30, where the first wireless transmission is received from an access point (AP), and the TX parameter IE indicates that the one or more second wireless communication devices have static transmission parameters.
32. The method of any of clauses 30-31, where the MIC is configured to verify an integrity of at least an access category (AC) or traffic stream (TS field) associated with the first wireless transmission.
33. The method of clause 30, where the first wireless transmission includes a frame received from a non-AP station (STA), and the second wireless transmission is received from the non-AP STA.
34. The method of clause 33, where the frame is included in an aggregated media access control (MAC) protocol data unit (A-MPDU).
35. The method of any of clauses 33-34, where the frame includes an initial physical layer (PHY) protocol data unit (PPDU) of an aggregated PPDU (A-PPDU).
36. The method of any of clauses 33-35, where the frame includes a public frame transmitted at a basic modulation and coding scheme (MCS).
37. The method of any of clauses 33-36, where the TX parameter IE is received with each transmission received from the non-AP STA.
38. The method of any of clauses 33-37, where the TX parameter IE is received periodically from the non-AP STA.
39. The method of any of clauses 33-38, where the TX parameter IE indicates a transmit power of the non-AP STA.
40. The method of any of clauses 33-39, where the TX parameter IE indicates one or more of changes in multiple-input multiple-output (MIMO) precoding used by the non-AP STA and changes in beamforming and antenna selection settings used by the non-AP STA.
41. The method of clause 40, where an index in the TX parameter IE indicates changes in the MIMO precoding or beamforming and antenna selection settings used by the non-AP STA.
42. The method of any of clauses 33-41, where the TX parameter IE indicates whether or not the non-AP STA has moved since the non-AP STA transmitted a previous frame including a TX parameter IE.
43. A first wireless communication device, including:
an interface configured to:
obtain a first wireless transmission including a transmit (TX) parameter information element (IE); and
obtain a second wireless transmission; and
a processing system configured to:
in response to a message integrity code (MIC) in the first wireless transmission not verifying an integrity of the TX parameter IE, discard the first wireless transmission;
in response to the MIC verifying the integrity of the TX parameter IE:

obtain one or more transmission parameters for one or more second wireless communication devices associated with the TX parameter IE; and obtain one or more wireless sensing measurements associated with the second wireless transmission and the one or more transmission parameters.

44. The first wireless communication device of clause 43, where the first wireless transmission is obtained from an access point (AP), and the TX parameter IE indicates that the one or more second wireless communication devices have static transmission parameters.

45. The first wireless communication device of any of clauses 43-44, where the MIC is configured to verify an integrity of at least an access category (AC) or traffic stream (TS field) associated with the first wireless transmission 46. The first wireless communication device of clause 43, where the first wireless transmission includes a frame obtained from a non-AP station (STA), and the second wireless transmission is obtained from the non-AP STA.

47. The first wireless communication device of clause 46, where the frame is included in an aggregated media access control (MAC) protocol data unit (A-MPDU).

48. The first wireless communication device of any of clauses 46-47, where the frame includes an initial physical layer (PHY) protocol data unit (PPDU) of an aggregated PPDU (A-PPDU).

49. The first wireless communication device of any of clauses 46-48, where the frame includes a public frame transmitted at a basic modulation and coding scheme (MCS).

50. The first wireless communication device of any of clauses 46-49, where the TX parameter IE is obtained with each transmission obtained from the non-AP STA.

51. The first wireless communication device of any of clauses 46-50, where the TX parameter IE is obtained periodically from the non-AP STA.

52. The first wireless communication device of any of clauses 46-51, where the TX parameter IE indicates a transmit power of the non-AP STA.

53. The first wireless communication device of any of clauses 46-52, where the TX parameter IE indicates one or more of changes in multiple-input multiple-output (MIMO) precoding used by the non-AP STA and changes in beamforming and antenna selection settings used by the non-AP STA.

54. The first wireless communication device of clause 53, where an index in the TX parameter IE indicates changes in the MIMO precoding or beamforming and antenna selection settings used by the non-AP STA.

55. The first wireless communication device of any of clauses 46-54, where the TX parameter IE indicates whether or not the non-AP STA has moved since the non-AP STA transmitted a previous frame including a TX parameter IE.

As used herein, a phrase referring to "at least one of" a list of items refers to any combination of those items, including single members. As an example, "at least one of: a, b, or c" is intended to cover: a, b, c, a-b, a-c, b-c, and a-b-c. The term "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A first wireless communication device, comprising:
an interface configured to:
obtain a first wireless transmission, the first wireless transmission including a transmit (TX) parameter information element (IE) and a message integrity code (MIC), wherein the first wireless transmission is associated with an access category (AC) or a traffic stream (TS) field; and
obtain a second wireless transmission; and
a processing system that includes one or more processors and one or more memories coupled with the one or more processors, the processing system configured to:
verify an integrity of the AC or the TS field associated with the first wireless transmission based at least in part on the MIC;
obtain one or more transmission parameters for one or more second wireless communication devices associated with the TX parameter IE based at least in part on verification of the integrity of the AC or the TS field; and
obtain, based at least in part on verification of the integrity of the AC or the TS field, one or more wireless sensing measurements associated with the second wireless transmission and the one or more transmission parameters.

2. The first wireless communication device of claim 1, wherein the processing system is further configured to verify an integrity of the TX parameter IE associated with the MIC in the first wireless transmission.

3. The first wireless communication device of claim 1, wherein the first wireless transmission is obtained from an access point (AP), the TX parameter IE indicates that each of the one or more second wireless communication devices have static transmission parameters, and the second wireless transmission is obtained from one of the one or more second wireless communication devices.

4. The first wireless communication device of claim 1, wherein the first wireless transmission comprises a frame obtained from a non-AP station (STA) and the second wireless transmission is obtained from the non-AP STA.

5. The first wireless communication device of claim 4, wherein the frame is included in an aggregated media access control (MAC) protocol data unit (A-MPDU).

6. The first wireless communication device of claim 4, wherein the frame comprises an initial physical layer (PHY) protocol data unit (PPDU) of an aggregated PPDU (A-PPDU).

7. The first wireless communication device of claim 4, wherein the frame comprises a public frame transmitted at a basic modulation and coding scheme (MCS).

8. The first wireless communication device of claim 4, wherein the TX parameter IE is obtained with each transmission received from the non-AP STA.

9. The first wireless communication device of claim 4, wherein the TX parameter IE is obtained periodically from the non-AP STA.

10. The first wireless communication device of claim 4, wherein the TX parameter IE indicates a transmit power of the non-AP STA.

11. The first wireless communication device of claim 4, wherein the TX parameter IE indicates one or more of changes in multiple input multiple-output (MIMO) precoding used by the non-AP STA, and changes in beamforming and antenna selection settings used by the non-AP STA.

12. The first wireless communication device of claim 11, wherein an index in the TX parameter IE indicates a change in the MIMO precoding or beamforming and antenna selection settings used by the non-AP STA.

13. The first wireless communication device of claim 4, wherein the TX parameter IE indicates whether or not the non-AP STA has moved since the non-AP STA transmitted a previous frame comprising a TX parameter IE.

14. A method for wireless communication by a first wireless communication device, comprising:
receiving a first wireless transmission, the first wireless transmission including a transmit (TX) parameter information element (IE) and a message integrity code (MIC), wherein the first wireless transmission is associated with an access category (AC) or a traffic stream (TS) field;
verifying an integrity of the AC or the TS field associated with the first wireless transmission based at least in part on the MIC;
receiving one or more transmission parameters for one or more second wireless communication devices associated with the TX parameter IE based at least in part on verification of the integrity of the AC or the TS field;
receiving a second wireless transmission from one of the one or more second wireless communication devices; and
receiving, based at least in part on verification of the integrity of the AC or the TS field, one or more wireless sensing measurements associated with the second wireless transmission and the one or more transmission parameters.

15. The method of claim 14, further comprising verifying an integrity of the TX parameter IE associated with the MIC in the first wireless transmission.

16. The method of claim 14, wherein the first wireless transmission is received from an access point (AP), the TX parameter IE indicates that each of the one or more second wireless communication devices have static transmission parameters.

17. The method of claim 14, wherein the first wireless transmission comprises a frame received from a non-AP station (STA) and the second wireless transmission is received from the non-AP STA.

18. The method of claim 17, wherein the frame is included in an aggregated media access control (MAC) protocol data unit (A-MPDU).

19. The method of claim 17, wherein the frame comprises an initial physical layer (PHY) protocol data unit (PPDU) of an aggregated PPDU (A-PPDU).

20. The method of claim 17, wherein the frame comprises a public frame transmitted at a basic modulation and coding scheme (MCS).

21. The method of claim 17, wherein the TX parameter IE is received with each transmission received from the non-AP STA.

22. The method of claim 17, wherein the TX parameter IE is received periodically from the non-AP STA.

23. The method of claim 17, wherein the TX parameter IE indicates a transmit power of the non-AP STA.

24. The method of claim 17, wherein the TX parameter IE indicates one or more of changes in multiple-input multiple-output (MIMO) precoding used by the non-AP STA and changes in beamforming and antenna selection settings used by the non-AP STA.

25. The method of claim 24, wherein an index in the TX parameter IE indicates changes in the MIMO precoding or beamforming and antenna selection settings used by the non-AP STA.

26. The method of claim 17, wherein the TX parameter IE indicates whether or not the non-AP STA has moved since the non-AP STA transmitted a previous frame comprising a TX parameter IE.

27. A non-transitory computer-readable storage medium storing instructions, that, when executed by one or more processors of a first wireless communication device, cause the first wireless communication device to perform operations comprising:

receiving a first wireless transmission including a transmit (TX) parameter information element (IE) and a message integrity code (MIC), wherein the first wireless transmission is associated with an access category (AC) or a traffic stream (TS) field;

verifying an integrity of the AC or the TS field associated with the first wireless transmission based at least in part on the MIC;

receiving one or more transmission parameters for one or more second wireless communication devices associated with the TX parameter IE based at least in part on verification of the integrity of the AC or the TS field;

receiving a second wireless transmission from one of the one or more second wireless communication devices; and receiving, based at least in part on verification of the integrity of the AC or the TS field, one or more wireless sensing measurements associated with the second wireless transmission and the one or more transmission parameters.

* * * * *